May 31, 1955     P. R. SCHROEPPEL     2,709,328
VIBRATION DAMPENING TRACTOR MOWER MOUNTING
Filed June 16, 1951     2 Sheets-Sheet 1

INVENTOR.
PAUL R. SCHROEPPEL
BY
Emerson B Donnell
ATT'Y.

May 31, 1955 P. R. SCHROEPPEL 2,709,328
VIBRATION DAMPENING TRACTOR MOWER MOUNTING
Filed June 16, 1951 2 Sheets-Sheet 2

INVENTOR.
PAUL R. SCHROEPPEL
BY
Emerson B Donnell
ATT'Y.

United States Patent Office 2,709,328
Patented May 31, 1955

2,709,328

VIBRATION DAMPENING TRACTOR MOWER MOUNTING

Paul R. Schroeppel, Rockford, Ill., assignor to J. I. Case Company, Racine, Wis., a corporation of Wisconsin Application June 16, 1951, Serial No. 231,970

4 Claims. (Cl. 56—25)

The present invention relates to agricultural implements and particularly to mowers and an object thereof is to provide such an implement which will avoid transmitting to the tractor the very considerable vibration characteristic of mechanisms of this class. The sickle bar of an average mower may weight as much as twenty (20) pounds and it is reciprocated by a crank and pitman device commonly running at as much as 900 rotations per minute. This results in 1800 reversals of the heavy sickle bar per minute and the development of high momentary horizontal reaction forces on the structure of the mower. In the past, these forces have been directly transmitted to the rigid structure of the tractor with very disagreeable results to the driver thereof and with detrimental effects on the mechanism of the tractor. Balancing of these vibrations is not a practical expedient at the present stage of development of the art but it has been discovered that discomfort to the operator and damage to the tractor can be largely if not wholly prevented by isolating these vibrations from the tractor. Accordingly, a further object of the invention is to provide means for permitting the natural vibrations of a mower or similar implement while keeping them in the implement and not transmitting them to the tractor or supporting vehicle.

Figure 1:
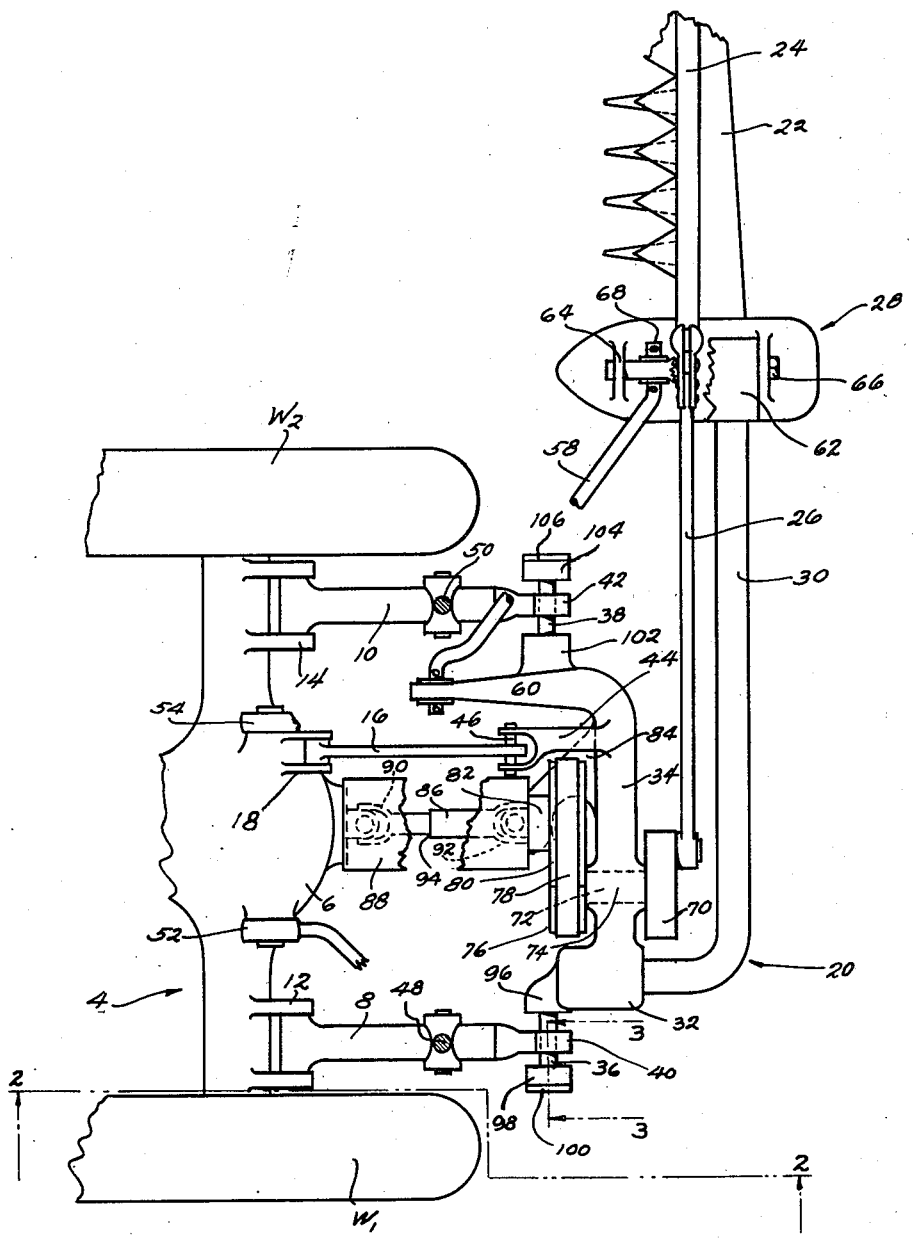
Figure 1 is a plan view of so much of a tractor mounted mower as is necessary for an understanding of the invention.

As seen in the drawings, the tractor comprises a rear axle portion generally designated as 4, having traction wheels W¹ and W² and a differential gear housing 6, it being understood that numerous other well-known parts common to tractors are included in the tractor but omitted from the drawings since they form no part of the present invention. In like manner, many parts of the mower have been omitted in the interests of a clear understanding of the principles embodied in the invention. For example, parts which might be fabricated of many pieces have been shown as one piece where functionally they act as a single piece. Nuts, bolts, pins, etc., well-known to those skilled in the art have not been shown in detail since they are common to all mechanisms and well understood by everyone.

Returning to the tractor, implement supporting and carrying arms 8 and 10 are pivotally connected as by bifurcated brackets 12 and 14 with axle portion 4, arms 8 and 10 being substantially rigid with the tractor insofar as lateral swinging is concerned. In the present instance, arms 8 and 10 are common to numerous implements which are adapted to be mounted on the tractor and a link 16 is pivoted to differential housing 6 on a bifurcated bracket 18.

Figure 2:
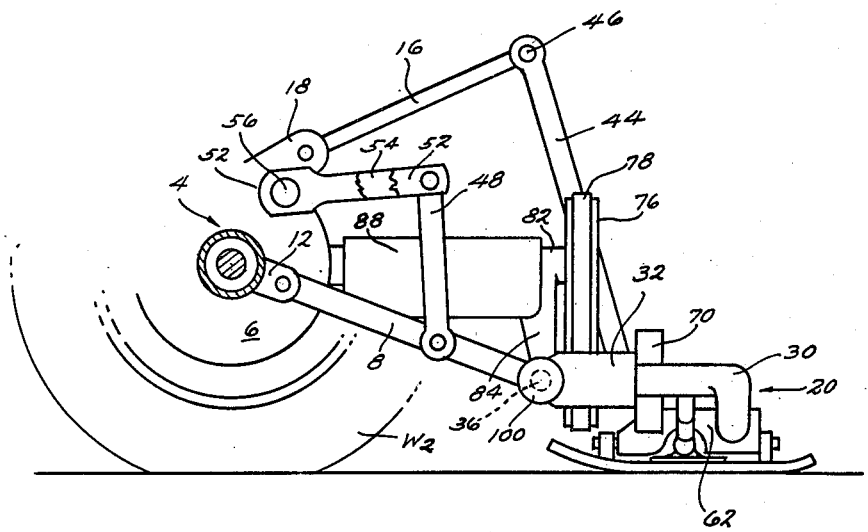
Fig. 2 is a vertical sectional view on the line 2—2 of Fig. 1.
Figure 3:
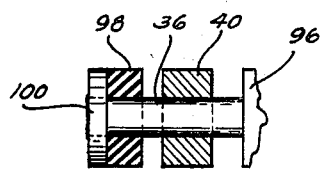
Figure 3 is an enlarged sectional view taken along line 3—3 of Figure 1.

The mower generally designated as 20 has a cutter bar 22 on which is mounted a reciprocable sickle 24 of conventional or well-known type and which is reciprocated by means of a pitman 26. Bar 22 is rigidly connected with a shoe generally designated as 28 and which is held against reciprocatory movement by means of a push bar 30. Push bar 30 is pivoted in a bearing 32 which is rigid with a frame 34, frame 34 being provided with a pair of pintles 36 and 38 by which it is supported and propelled, pintles 36 and 38 being engaged by any suitable type of eye or holding devices 40 and 42 constituting with the pintles, complementary bearing means supporting the frame 34 from arms 8 and 10. A mast portion 44 projects upwardly and forwardly from frame 34 and has a pivotal connection by means of a pin 46 with above mentioned link 16. Arms 8 and 10 are supported by bifurcated lifting rods 48 and 50 which as more particularly shown in Fig. 2 are pivotally connected with arms 52 and 54 respectively fixed on a shaft 56 journaled on a portion of differential housing 6. Shaft 56 is controlled by a power lift mechanism not shown, since it forms no part of the invention but which may be operated to swing arms 52 and 54 so as to raise arms 8 and 10 to any desired position within the range of possible adjustment. In this way, mower frame 34 is carried at a desired elevation above the ground while shoe 28 is caused to slide along over the field being mowed and may rise and fall about bearing 32 as a center, push bar 30 maintaining shoe 28 in proper relation to frame 34 as is common. In order to relieve push bar 30 from the burden of propelling shoe 28, a pulling link 58 is pivoted to a forwardly extending portion 60 of frame 34. Push bar 30 is engaged with a member 62 which arches over pitman 26 and is pivotally connected at 64 and 66 with shoe 28 so that cutter bar 22 may swing up and down relatively to push bar 30 to follow the contour of the ground. Pulling link 58 is pivotally connected at 68 with above mentioned fitting 62.

Pitman 26 is actuated in well-known manner by a crank 70 mounted on a shaft 72 journaled in a bearing portion 74 fixed in relation to frame 34, shaft 72 being driven by means of a pulley 76 driven by a belt 78 from a pulley 80, pulley 80 being carried on a suitable bearing 82 supported on a portion 84 extending upwardly from frame 34 and actuated by a shaft 86 enclosed in a safety shield 88 and driven by the tractor power take-off in well-known manner, not necessary to illustrate. Shaft 86 is of the type providing for limited displacement of bearing 82 relatively to the tractor and which commonly comprises a pair of universal joints 90 and 92 and a sliding non-rotative connection 94.

When the mower is in operation, sickle bar 24 is rapidly reciprocated, which action requires a rapid reversal of movement at either end of its stroke with the development of very considerable force first in one direction and then in the other. This force must be developed by pitman 26 which tends to displace crank 70 and shaft 72 in bearing 74, with an equal and opposite force. This force tends to displace frame 34 in an amount inversely proportional to the weights of sickle bar 24 and frame 34 and its attached parts. The result is a very considerable vibration of frame 34 substantially in the direction, or vertical plane of, and in opposite phase to the reciprocations of sickle bar 24. It is this slight but rapid displacement of frame 34 which has caused a disagreeable and detrimental vibration in the tractor in prior tractor mouned mowers. In the present instance, pintles 36 and 38 are made of such a length that holding device 40 is of considerably less width than the length of pintle 36, the difference, as clearly apparent in the drawings, being greater than the amplitude of the vibratory movement set up in frame 34. Pintle 36 is fixed in a boss 96 on frame 34 and has a cushion of rubber or rubber-ike material 98 interposed between holding device 40 and a head 100. In like manner, pintle 38 is fixed in relation to a boss 102 and has a cushion 104 introduced between holding device 42 and a head 106. Frame 34 may therefore shift or "float" slightly in relation to holders 40 and 42 so that its slight movements constituting the above referred to vibration are not transferred to any appreciable extent to arms 8 and 10. In the event that the pintles 36 and 38 and frame 34 should tend to shift in one direction more than the other, one or the other of cushions 98 and 104 would come into contact with its respective holding device 40 or 42 so that there would be no metal to metal connection between the pintle and its holding device insofar as lateral vibratory movement is concerned.

It will be understood that various means of adjustment, safety release, counterbalancing means, and other details common to mowers are contemplated as part of the present device but which are omitted since they would tend to obscure the invention rather than to clarify it, but it is thought to be clear that a device has been shown which will accomplish the objects of the invention.

What is claimed as new and desired to be secured by Letters Patent of the United States is:

1. In a tractor mounted mower including a frame, a rotating driving shaft journaled on the frame, a reciprocatory sickle, an actuating connection between said shaft and said sickle for reciprocating said sickle in response to rotations of said shaft whereby force reactions resulting from the rapid reversal of said sickle will be transmitted to said shaft and thence to said frame, in combination, laterally rigid supporting means on the tractor, and complementary bearing means connecting said supporting means and said frame and constituted to provide lost motion between said supporting means and said frame in the direction of said force reactions, and said lost motion being of an extent greater than the normal vibratory movement of said frame whereby to provide freedom of vibratory movement of said frame without transmission of such movement to said supporting means and to said tractor.

2. In a vehicle mounted implement the combination of a vehicle, a laterally rigid supporting element on the vehicle, a vibratory implement having a frame element, a pintle on one element extending in the direction of vibration of the implement, and a holding device on the other element, embracing the pintle, said pintle being of a length to extend beyond the margins of said holding device to an extent in excess of the normal vibratory movement of the implement so as to provide freedom for vibratory shifting movement of said frame element axially of the pintle relatively to said supporting element and said vehicle.

3. In a vehicle mounted implement the combination of a vehicle, a laterally rigid supporting element on the vehicle, a vibratory implement having a frame element, a pintle on one element and a holding device on the other element, embracing the pintle, said pintle extending in the direction of vibratory movement of said frame element and being of a length to extend beyond the margins of said holding device to an extent greater than the normal vibratory movement of said frame element so as to provide freedom for vibratory shifting movement of said frame element axially of the pintle relatively to said supporting element and said vehicle, and resilient bumper means on said pintle positioned to engage said supporting element upon a predetermined amount of such axial shifting movement of said pintle.

4. In a vehicle mounted implement the combination of a vehicle, a laterally rigid supporting element on the vehicle, a vibratory implement having a frame element, complementary bearing means on said elements adapted to provide for movement of said frame element relatively to said supporting element in a direction substantially parallel to the line of vibrational movement of said frame element and to an extent greater than that of said vibrational movement, and said elements having movement limiting abutments positioned to arrest further movement of said frame element after predetermined movement in said direction of vibrational movement.

References Cited in the file of this patent

UNITED STATES PATENTS

| Number | Name | Date |
|---|---|---|
| 260,040 | Megill | June 27, 1882 |
| 1,532,358 | Weidemann | Apr. 7, 1925 |
| 2,166,967 | Raney et al. | July 25, 1939 |
| 2,540,263 | Hilblom | Feb. 6, 1951 |
| 2,579,274 | Richey | Dec. 18, 1951 |